US006884054B2

(12) United States Patent
Shimada

(10) Patent No.: US 6,884,054 B2
(45) Date of Patent: Apr. 26, 2005

(54) ROTARY POWDER COMPRESSION MOLDING MACHINE

(75) Inventor: Keiji Shimada, Kyoto (JP)

(73) Assignee: Kikusui Seisakusho Ltd, Kyoto (JP)

( * ) Notice: Subject to any disclaimer, the term of this patent is extended or adjusted under 35 U.S.C. 154(b) by 0 days.

(21) Appl. No.: 10/484,306

(22) PCT Filed: Aug. 6, 2001

(86) PCT No.: PCT/JP01/06759

§ 371 (c)(1),
(2), (4) Date: Jan. 20, 2004

(87) PCT Pub. No.: WO03/013836

PCT Pub. Date: Feb. 20, 2003

(65) Prior Publication Data

US 2004/0191349 A1 Sep. 30, 2004

(51) Int. Cl.[7] .......................... B29C 33/60; B29C 43/28

(52) U.S. Cl. ....................... 425/107; 425/145; 425/218; 425/345

(58) Field of Search ........................... 425/96, 99, 100, 425/107, 215, 218, 145, 345

(56) References Cited

U.S. PATENT DOCUMENTS 4,047,866 A * 9/1977 Shah .......................... 425/107
5,624,690 A * 4/1997 Boldis et al. ............... 425/100
6,079,968 A * 6/2000 Schmitz et al. ............... 425/96

* cited by examiner

*Primary Examiner*—Benjamin L. Utech
*Assistant Examiner*—Thu Khanh T. Nguyen
(74) *Attorney, Agent, or Firm*—Banner & Witcoff, Ltd

(57) ABSTRACT

In a rotary compressive molding machine for powder material in which powder material filled in a die hole 41 of a die 4 mounted on a rotary table 3 is compressed and molded between a lower face 5*a* of an upper punch 5 and an upper face 6*a* of a lower punch 6, a powder lubricant supplying means LS that supplies the upper face 6*a* of the lower punch 6, the lower face 5*a* of the upper punch 5 and the die hole 41 with a predetermined quantity of powder lubricant L prior to filling the powder material comprises a powder lubricant supplying portion LS1 that sends the powder lubricant L, a flow quantity detecting portion LS2 that detects a flow quantity of the powder lubricant L, a retrieved quantity detecting portion LS3 that detects a quantity of superfluous powder lubricant L that has not been used, and a control portion LS4 that controls the powder lubricant supplying portion LS1 by computing a quantity of the powder lubricant L to send out based on a quantity detected by the flow quantity detecting portion LS2 and the retrieved quantity detecting portion LS3 respectively.

4 Claims, 9 Drawing Sheets

ROTARY POWDER COMPRESSION MOLDING MACHINE

FIELD OF THE ART

This invention relates to a rotary compressive molding machine for powder material that compresses powder material in order to mold a tablet or the like.

BACKGROUND ART

Conventionally, in case medical tablets are manufactured by the use of this kind of rotary compressive molding machine if raw powder material of a medical tablet is made of a medicine formulation ingredient alone, a sticking phenomenon such that the raw powder material or the medical tablet sticks into a punch or a die might occur. In order to prevent this kind of problem, a method for tableting the powder material wherein powder lubricant such as magnesium stearate or the like is mixed into the raw powder material has been generally used.

Senile medical field is recently considered to be essential. This increases a demand for tablets which are easy to melt or collapse in a mouth so that elder persons can swallow it without difficulty or for tablets which melt immediately after swallowed so as to produce the efficacy of the medicine. However, in case the medical tablets are manufactured by the above-mentioned conventional method the powder lubricant mixed into the raw powder material hinders collapsing or melting in a mouth, which makes it difficult to meet the above-mentioned demand. In addition, due to a mixture of the powder lubricant, the tablets become fragile.

In view of the situation and with an object to prevent a sticking phenomenon considered, there is no need of mixing the powder lubricant with a medicine formulation ingredient. Then it has been examined that the lubricant is sprayed so as to adhere to a part alone where a sticking phenomenon occurs such as a surface of the punches and the tablet can be made of the powder material made of a medicine formulation ingredient alone. In view of the above, it has been conceived that powder lubricant is sprayed to the upper and the lower punches and the die hole prior to compression and molding a tablet.

However, there might be a problem that the powder lubricant is scattered when sprayed or a problem of contamination such that powder lubricant is mixed with a medicine formulation ingredient or a medicine formulation ingredient is mixed into powder lubricant when the lubricant is sprayed, resulting in unevenness of the powder lubricant adhering to the upper and lower punches. In order to prevent the powder lubricant from scattering it has been conceived that the punches are surrounded at a position where the powder lubricant is sprayed. However, this arrangement requires an opening through which the powder lubricant passes for the upper punch, thereby to be unable to suppress scattering the powder lubricant effectively.

In addition, since the powder lubricant is applied to the tip of the punch and the die hole, the quantity of the power lubricant is very subtle. However, it was difficult to measure the subtle quantity of the powder lubricant to spray the powder lubricant. For example, in a case of a storing tank in which the powder lubricant can be stored and whose bottom face is formed with an elastic membrane plate member so as to take out a subtle quantity of the powder lubricant through the bottom face thereof, wherein a small-diameter hole is provided on the membrane plate member and the membrane plate member is vibrated by a pulse air vibration wave, a quantity of the powder lubricant measured in the small-diameter hole varies according to a pulse of the pulse air vibration wave and a transformation degree of the membrane plate member, which makes it difficult to measure the quantity with accuracy. As a result of this, if a quantity of the powder lubricant is measured something over, a superfluous powder lubricant that is not applied to the tip of the punch or the die hole scatters inside the rotary compressive molding machine for powder material, resulting in growing a problem of contamination.

The present claimed invention intends to solve all of the above problems.

DISCLOSURE OF THE INVENTION

In order to attain the object the present claimed invention has the following arrangement. More specifically, a rotary compressive molding machine for powder material in accordance with the present claimed invention has an arrangement in which a powder lubricant supplying means comprises a powder lubricant supplying portion that stores powder lubricant and sends out a predetermined quantity of powder lubricant continuously, a flow quantity detecting portion that detects a flow quantity of the powder lubricant, a retrieved quantity detecting portion that detects superfluous powder lubricant that does not attach to either a tip of a punch or a die hole and a control portion that controls the powder lubricant supplying portion by computing the necessary quantity of the powder lubricant based on the quantity detected by the flow quantity detecting portion and the retrieved quantity detecting portion respectively in order to measure a subtle quantity of the powder lubricant with accuracy.

The present claimed invention is a rotary compressive molding machine for powder material wherein a rotary table is rotatably arranged in a frame through an upright shaft, a die having a die hole is arranged on the rotary table, an upper punch and a lower punch are kept above and below the die in a vertically slidable condition and powder material filled in the die hole is compressed and molded between a lower face of the upper punch and an upper face of the lower punch by pushing the upper punch and the lower punch so as to approach each other with their tip inserted into the die hole, comprising a powder lubricant supplying means that supplies the upper face of the lower punch, the lower face of the upper punch and the die hole with a predetermined quantity of powder lubricant prior to filling the powder material, and characterized by that the powder lubricant supplying means comprises a powder lubricant supplying portion that stores powder lubricant and sends out the stored powder lubricant at a required quantity continuously, a flow quantity detecting portion that detects a flow quantity of the powder lubricant sent out from the powder lubricant supplying portion, a retrieved quantity detecting portion that detects a quantity of superfluous powder lubricant other than the powder lubricant actually used while the powder material is compressed and molded based on the quantity detected by the flow quantity detecting portion, and a control portion that computes a quantity of the powder lubricant to send out based on a quantity detected by the flow quantity detecting portion and the retrieved quantity detecting portion respectively and controls the powder lubricant supplying portion so as to send out the powder lubricant at a computed quantity.

In accordance with the arrangement, the powder lubricant supplying portion continuously sends out stored powder lubricant at a predetermined quantity. The flow quantity detecting portion detects a quantity of the powder lubricant sent out from the powder lubricant supplying portion and outputs the detected quantity to the control portion. The retrieved quantity detecting portion detects a quantity of superfluous powder lubricant other than the powder lubricant actually used and outputs the detected quantity (retrieved quantity) into the control portion. The control portion computes a quantity of the powder lubricant to send out based on the input quantity detected by the flow quantity detecting portion and the retrieved quantity detecting portion respectively and controls the powder lubricant supplying portion so as to send out the powder lubricant at a computed quantity.

As a result of this, it is possible to control a quantity of the powder lubricant that is actually required to spray based on the quantity of the powder lubricant that is actually sends out and the quantity of the powder lubricant that is retrieved, which makes it possible to control the quantity of the powder lubricant to be sprayed with high accuracy. Therefore, the powder lubricant can be used effectively, thereby to minimize a quantity of the powder lubricant to be used. In addition, since a quantity of the superfluous powder lubricant can be reduced, it is possible to suppress mixture of the powder lubricant into a powder material to be compressed and molded in a cy-press manner and also possible to prevent a problem such as a case in which powder lubricant attaches to the die or the rotary table unnecessarily and to be lumpy and then drops when a lump of the powder lubricant grows to a certain size. The lump of the powder lubricant might drop on the rotary table and crash into pieces and the powder lubricant is mixed into the powder material. With this arrangement, a case like the above can be prevented from occurring.

It is preferable that the flow quantity detecting portion comprises a light transparent detecting pipe inside of which the powder lubricant flows, a light source that irradiates light on the powder lubricant that flows inside the detecting pipe and a light detector that detects scattered light that is scattered by the powder lubricant inside the detecting pipe and that the flow quantity of the powder lubricant flowing inside the flow quantity detecting portion is detected by means of scattered luminous intensity. As mentioned, since the flow quantity detecting portion makes use of the intensity of the scattered light scattered by the powder lubricant flowing inside the detecting pipe, it is possible to detect a subtle quantity of the flowing powder lubricant.

It is preferable that the powder lubricant supplying means further comprises a powder sucking mechanism that introduces the superfluous powder lubricant into the retrieved quantity detecting portion. As mentioned, with the powder sucking mechanism provided, it is possible to detect the flow quantity of the powder lubricant by making use of the above light or electrical capacitance, thereby to improve an accuracy of detecting a retrieved quantity. Therefore, it is possible to accurately detect a quantity that is actually used based on the supplied quantity of the powder lubricant detected by the flow quantity detecting portion and the retrieved quantity of the powder lubricant, which makes it possible to control the supplying quantity of the powder lubricant with accuracy.

The flow quantity detecting portion is represented by that comprising an electrode for measurement that detects electrical capacitance of the powder lubricant flowing inside the detecting pipe and that the flow quantity of the powder lubricant is detected based on a variation of the electrical capacitance detected by the electrode for measurement.

BEST MODES OF EMBODYING THE INVENTION

The invention will be described in detail with reference to an embodiment thereof shown in the accompanying drawings.

Figure 1:
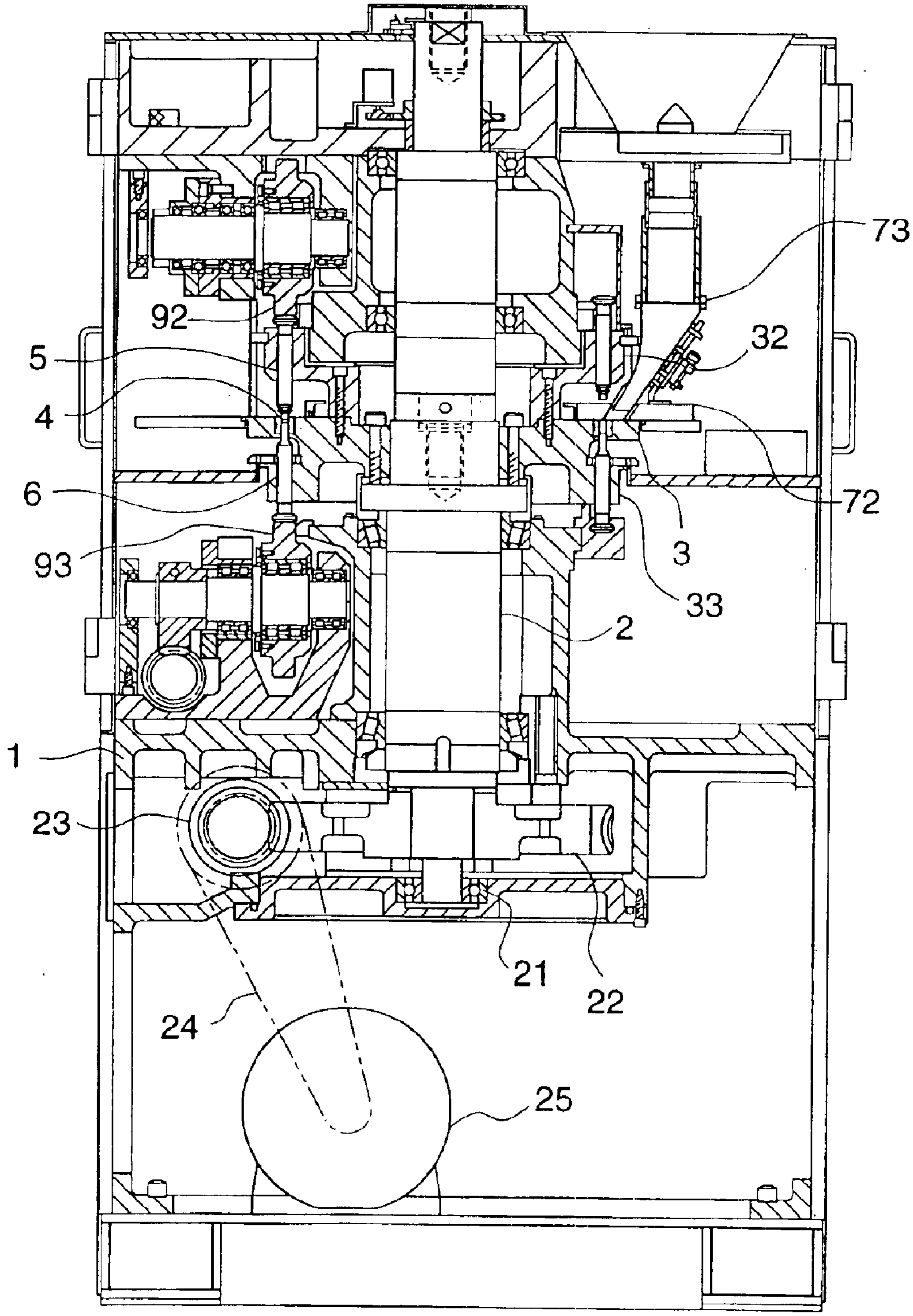
FIG. 1 is a front cross-sectional view of a rotary compressive molding machine for powder material showing one embodiment of the invention.

FIG. 1 shows a general arrangement of the rotary compressive molding machine for powder material of the invention. The rotary compressive molding machine for powder material has a device LS for supplying and spraying powder lubricant that supplies powder lubricant L, and a rotary table 3 is horizontally rotatably arranged in a frame 1 through an upright shaft 2, a plurality of dies 4 are arranged on the rotary table 3 at a predetermined pitch and upper punches 5 and lower punches 6 are kept in a vertically slidable condition above and below of each dies 4.

Figure 3:
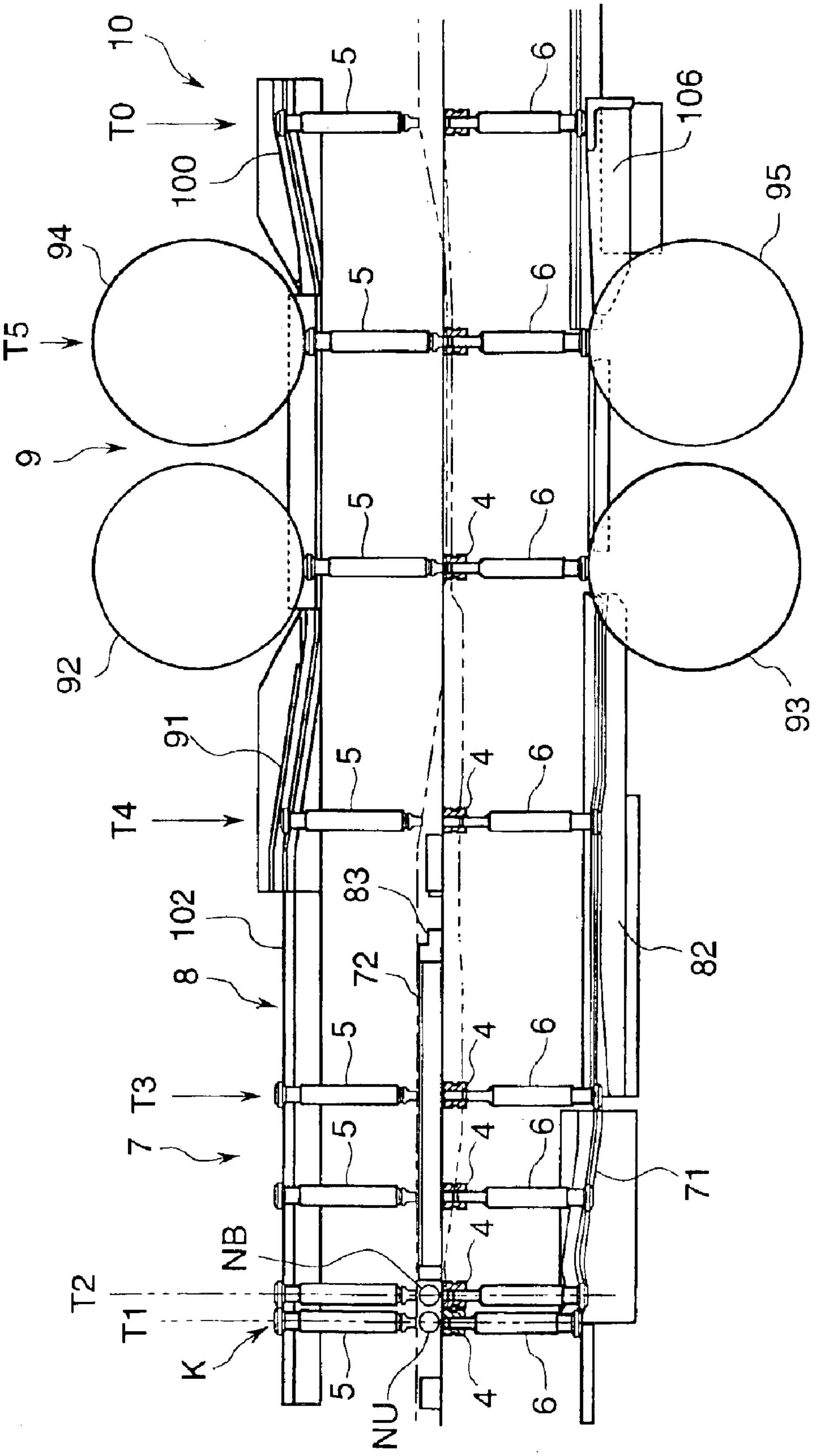
FIG. 3 is a cross-sectional front view showing the rotary table of the embodiment in a developed condition.
Figure 5:
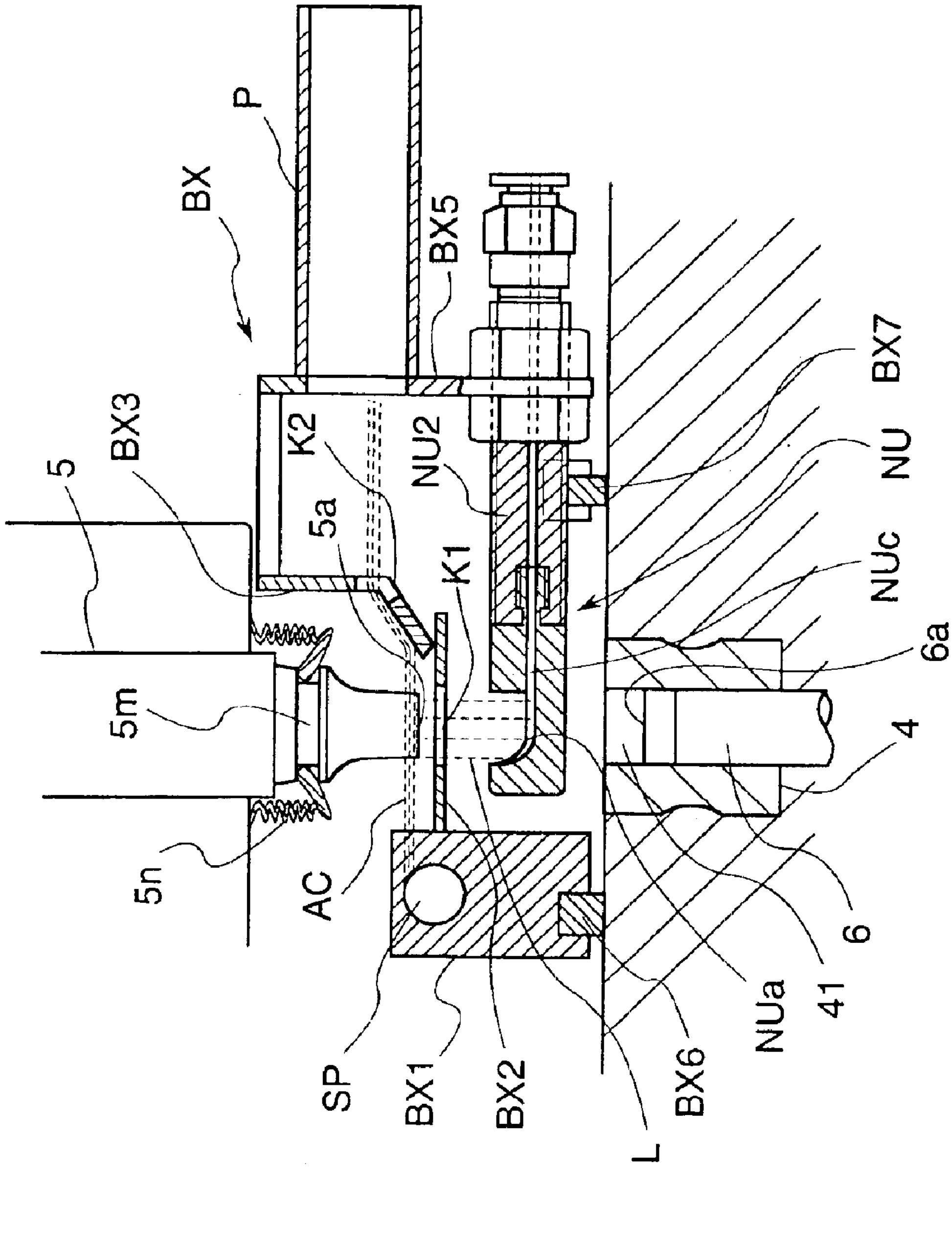
FIG. 5 is a cross-sectional end view taken along the line A—A in FIG. 4.

More specifically, the upright shaft 2 supported by a bearing 21 is arranged at a general center of the frame 1 and a worm wheel 22 is fixed near a bottom end of the upright shaft 2 so that rotational driving force of a motor 25 is transmitted to the worm wheel 22 through a worm 23 and a belt 24. The rotary table 3 that is divided into two functional parts is fixed near a head of the upright shaft 2. The rotary table 3 comprises an upper punch retaining portion 32 which is provided at the upper side thereof and retains the upper punches 5 in a vertically slidable condition and a die portion 33 which is provided at the lower side thereof and retains the lower punches 6 in a vertically slidable condition and provided with a plurality of die mounting holes for mounting the dies 4 detachably at positions facing to the upper punch retaining portion 32 on the same circle as that of the upper punch retaining portion 32. A plurality of punch retaining holes which hold the upper punches 5 and the lower punches 6 slidably are provided on the upper punch retaining portion 32 and the die portion 33. Each of the punch retaining holes and the die mounting holes are arranged so that centers of the lower punch 6, the upper punch 5 and the die 4 coincide with each other longitudinally on the rotary table 3. A big diameter portion is provided, as shown in FIG. 3, at an upper end of the upper punch 5 and a lower end of the lower punch 6 respectively and each of the upper punch 5 and the lower punch 6 is so arranged to make an up-and-down movement with its big diameter portion engaged and guided by a cam which will be described later. Longitudinally penetrating holes 41 are provided on the dies 4 in order to insert a tip of the upper punch 5 or the lower punch 6. At a lower end of the upper punch 5 provided is a bellow 5*n* whose upper end is fixed to the lower face of the upper punch retaining portion 32 and whose lower end fits into a circular groove 5*m* arranged at a lower end portion of the upper punch 5 and that covers a trunk portion of the upper punch 5 when the upper punch 5 projects out of the die hole 41 so as not to adhere the powder lubricant L on the trunk portion of the upper punch 5. (FIG. 5)

Figure 2:
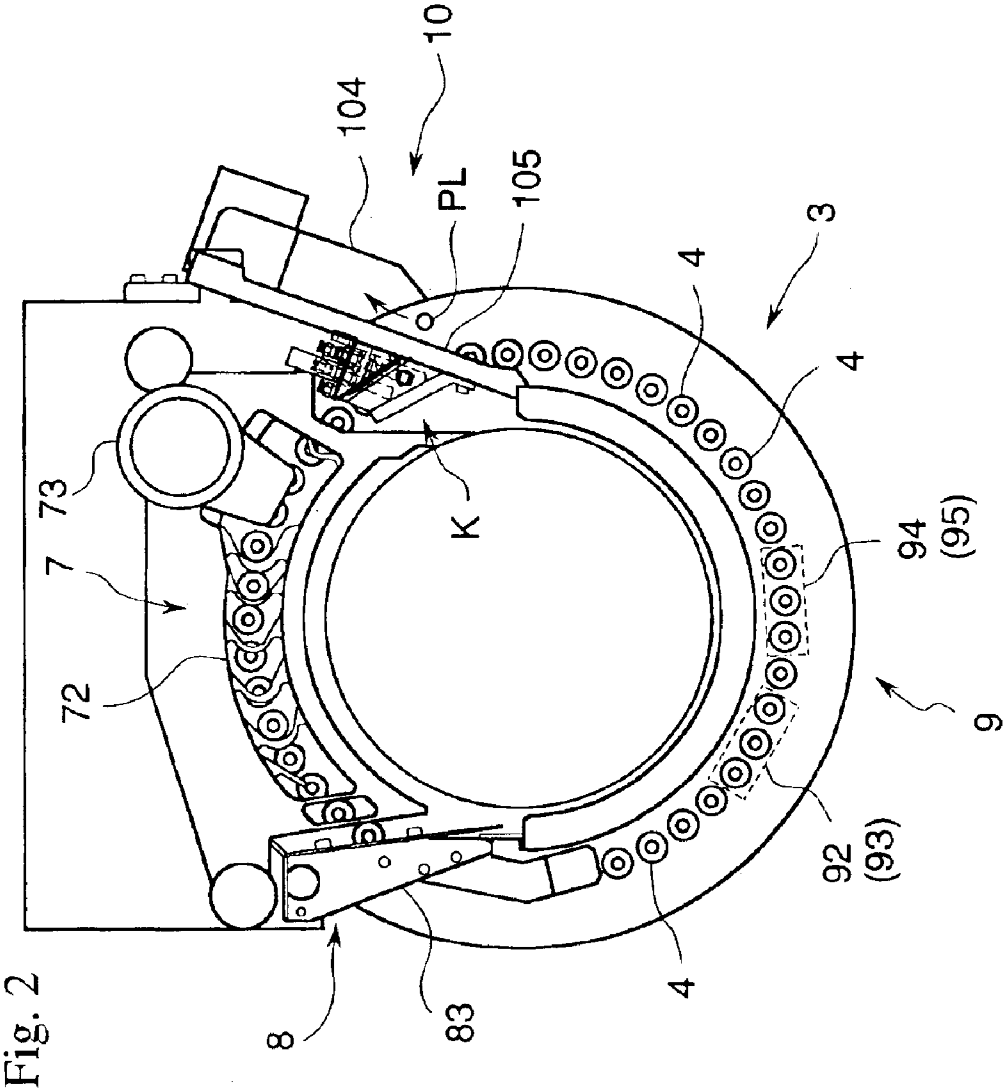
FIG. 2 is a schematic plane view showing a rotary table of the embodiment.

The rotary compressive molding machine for powder material is, as shown in FIG. 2 and FIG. 3, provided with a filling portion 7, a leveling portion 8, a compressive molding portion 9, an unloading portion 10 and a powder lubricant spraying portion K sequentially along the direction of rotation.

The filling portion 7 introduces powder material which has been supplied on the rotary table 3 into the die 4 through a feed shoe 72 by lowering the lower punch 6 with a lowering device 71. The powder material is supplied on the rotary table 3 by means of a powder material supplying mechanism 73.

The leveling portion 8 raises the lower punch 6 to a predetermined level by means of a quantity setting rail 82 and removes the powder material which has overflowed from the die 4 due to a rise of the lower punch 6 by means of a leveling plate 83.

The compressive molding portion 9 comprises an upper punch lowering cam 91 which lowers the upper punch 5 so as to insert a lower tip of the upper punch 5 into the die 4, upper and lower preliminary compressive rollers 92, 93 which are to preliminarily compress the powder material filled in the die 4 with the upper and lower punches 5, 6 each of whose lower and upper tips is inserted into the die 4 pushed from upside and downside to approach each other and upper and lower compressive rollers 94, 95 which are to compress the powder material in the die 4 with the upper and lower punches 5, 6 pushed from upside and downside to approach each other in a full-scale manner.

The unloading portion 10 comprises, as shown in FIG. 2 and 3, an upper punch raising cam 100 which is to raise the upper punch 5 along a rising slant face so as to draw the tip of the upper punch 5 out of the die 4, a pushing up rail 106 which urges the lower punch 6 upward so that a tablet PL in the die 4 can be completely pushed out of the die 4 and a guide plate 105 which guides the tablet PL aside so as to introduce the tablet PL into a shoot 104.

The powder lubricant spraying portion K is arranged between the unloading portion 10 and the filling portion 7. The powder lubricant spraying portion K is to supply the lower face 5*a* of the upper punch 5, the upper face 6*a* of the lower punch 6 and the inner face of the die hole 41 with powder lubricant L by preventing the powder lubricant L from scattering and, as shown in FIG. 4, has a box body BX that surrounds space where the powder lubricant L is continuously sprayed except for a penetrating hole K1 into which the powder lubricant L for the upper punch 5 passes and except for an inlet K2 into which an air curtain AC as a high-speed airflow is inhaled, wherein a distal end of an upper nozzle NU that sprays the powder lubricant L into the upper punch 5 and a distal end of the lower nozzle NB that sprays the powder lubricant L into the lower punch 6 and the die hole 41 are included in the box body BX and the air curtain AC is sprayed toward the inlet K2 with passing over the penetrating hole K1.

Figure 4:
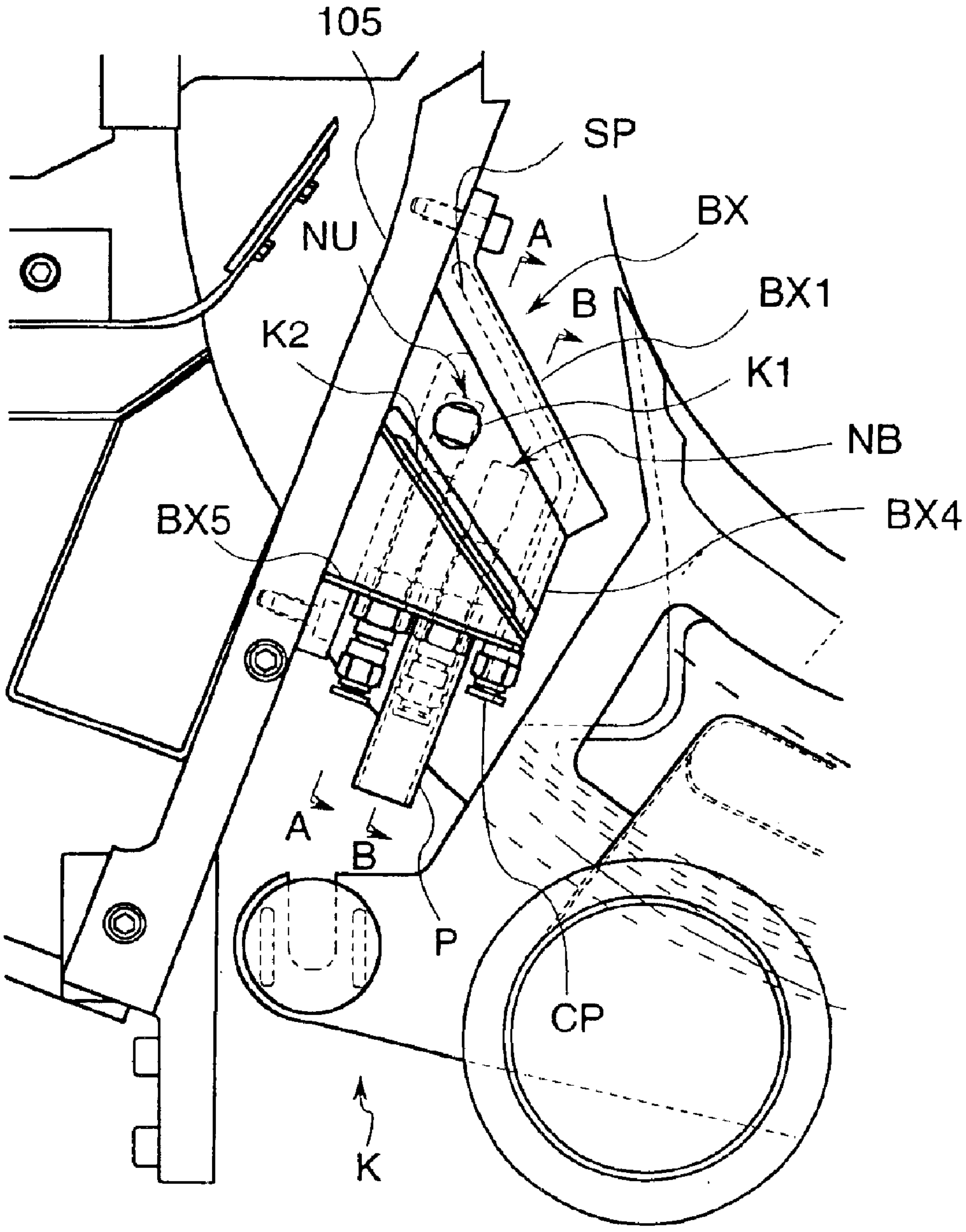
FIG. 4 is a magnified plane view showing a spraying portion of powder material of the embodiment.
Figure 6:
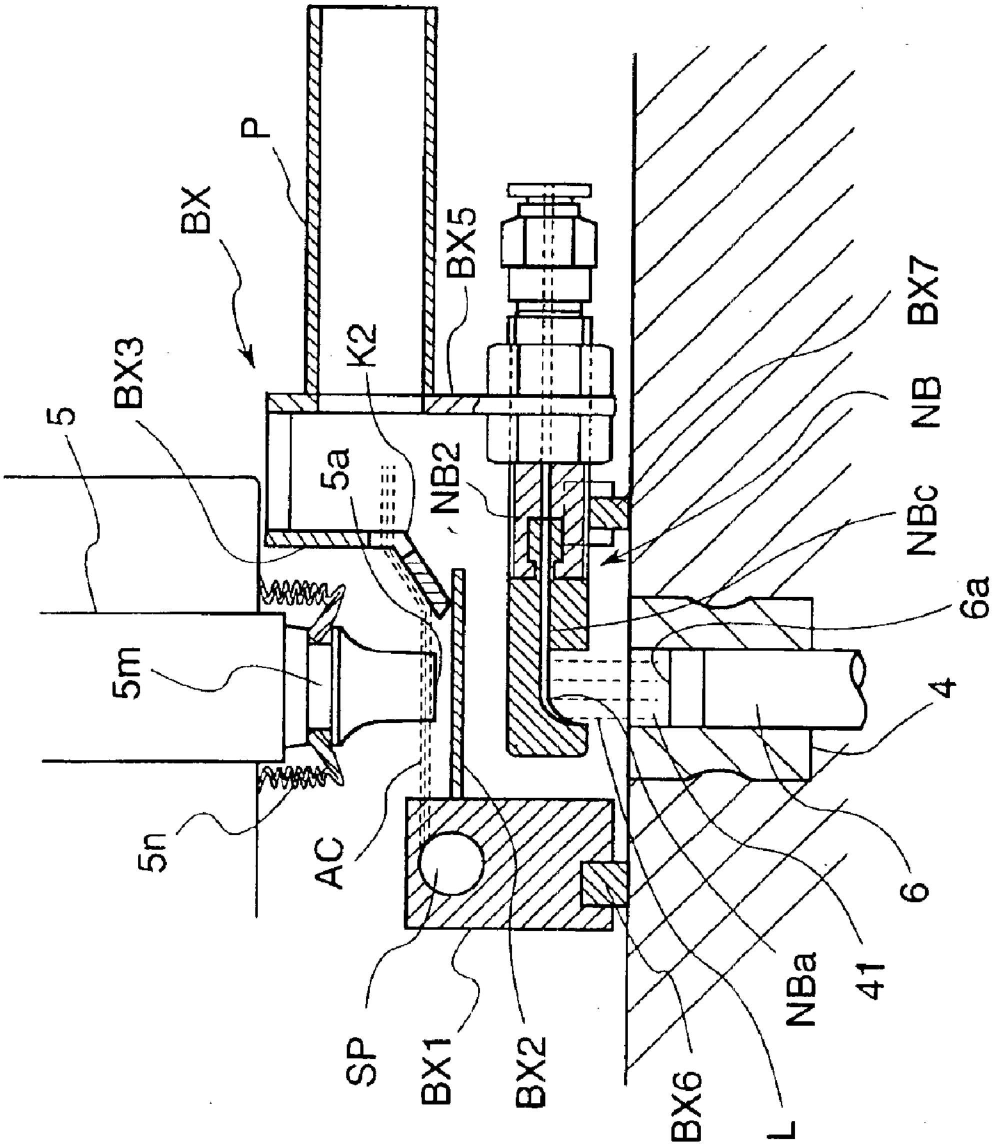
FIG. 6 is a cross-sectional end view taken along the line B—B in FIG. 4.

More specifically, in the powder lubricant spraying portion K, the powder lubricant spraying means that is a part of the powder lubricant supplying means that supplies the upper punch 5, the lower punch 6 and the die hole 41 with the powder lubricant L comprises, as shown in FIG. 4 through FIG. 6, the upper nozzle NU and the lower nozzle NB each of which has a concave face NUa, NBa and each of which locates to face to an end face of the upper punch 5 and the lower punch 6 respectively at a position where the powder lubricant L is supplied and which sprays the powder lubricant L as a spraying nozzle generally into one direction with guided by the concave face NUa, NBa and an air flow supplying mechanism that includes the air curtain AC that prevents superfluous powder lubricant L sprayed through the upper nozzle NU and the lower nozzle NB from scattering upward by spraying an high-speed air flow into near of the lower end 5*a* of the upper punch 5. The upper nozzle NU and the lower nozzle NB are mounted on the box body BX and connected to the device LS for supplying and spraying powder lubricant that measures an extremely subtle quantity of the powder lubricant L and that sends the measured powder lubricant L by making use of pressurized gas.

Figure 7:
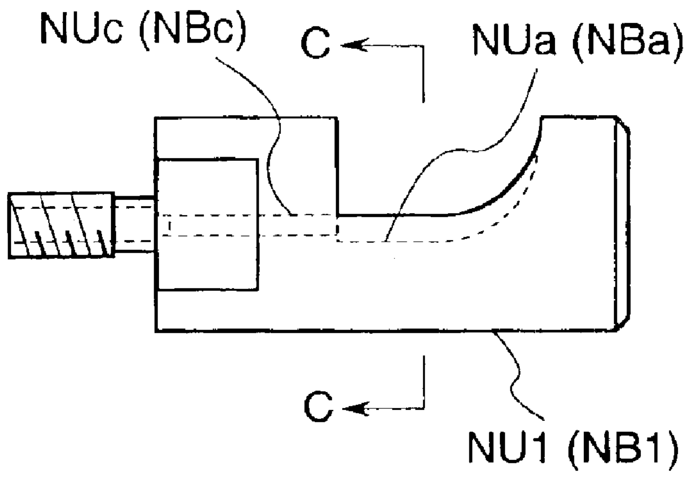
FIG. 7 is a side view of a tip end of the upper nozzle (lower nozzle) of this invention.
Figure 8:
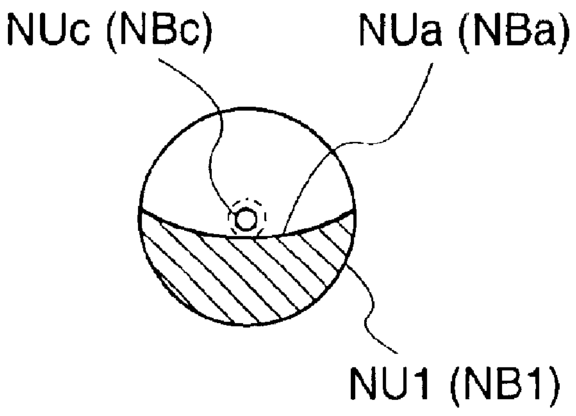
FIG. 8 is a cross-sectional view taken along the line C—C in FIG. 7.

The distal end NU1, NB1 of the upper and lower nozzles NU, NB can be dismounted from a nozzle body NU2, NB2. As shown in FIG. 7 and FIG. 8, the distal end NU1, NB1 has a concave face NUa, NBa consisting of a three dimensional face and is provided with an introduction hole NUc, NBc that passes through from an axial end of the distal end NU1, NB1 to the concave face NUa, NBa. An inner face of the introduction hole NUc, NBc is not flat to the concave face NUc, NBc and opens toward a side of the concave face NUa, NBa so that a slight step is formed between the concave face NUa, NBa and the inner face of the introduction hole NUc, NBc. In accordance with the arrangement, the powder lubricant L is introduced into an intended direction without attaching to the concave face NUa, NBa when sprayed. Each of the concave faces NUa, NBa of the distal end NU1, NB1 of the upper and lower nozzles NU, NB is mounted so as to face the upper punch 5 and the lower punch 6 respectively. More specifically, the distal end NU1 of the upper nozzle NU is mounted with its concave face NUa facing upward in a condition that its mounting shaft is parallel to the rotary table 3. The distal end NB1 of the lower nozzle NB is mounted with its concave face NBa facing downward as well as the upper nozzle NU. A distal end portion of the concave face NUa of the upper nozzle NU is arranged to locate just under the through hole K1.

The box body BX is fixed on a surface facing the feed shoe 72 of the guide plate 105 and comprises a first side wall BX1 inside of which a supplying pipe SP for air of the air curtain AC is arranged, a first upper wall BX2 that is horizontally fixed to the first side wall BX1 and at a position of which corresponding to the upper punch 5 arranged is a through hole K1, a second upper wall BX3 that is arranged continuous to the first upper wall BX2 and at a position near the first upper wall BX2 provided is an inlet K2 to which the air curtain AC is guided, a second side wall BX4 that has a guide pipe to guide the air for the air curtain AC to the supplying pipe SP and that is fixed to the first side wall BX1 so as to be parallel to the guide plate 105, a third side wall BX5 that is mounted on the second side wall BX4 to form generally a right angle in a plane view and elastic members BX6 and BX7 each of which seals a gap between the rotary table 3 and the first side wall BX1, a gap between the rotary table 3 and the upper nozzle NU and a gap between the rotary table 3 and the lower nozzle NB respectively. The upper nozzle NU, the lower nozzle NB and a pipe P for picking up dust are mounted on the third side wall BX5 of the box body BX. A connector CP to introduce air for the air curtain Ac is mounted on an end face of the second side wall BX4 through the third side wall BX5. The connector CP is connected to an air compressor, not shown in drawings, to generate pressurized air for forming the air curtain AC and an air supplying mechanism comprises the air compressor, the supplying pipe SP and the connector CP. The pipe P for picking up dust is connected to a dust pick-upper LS5 and constitutes a powder sucking mechanism together with the box body BX.

Figure 9:
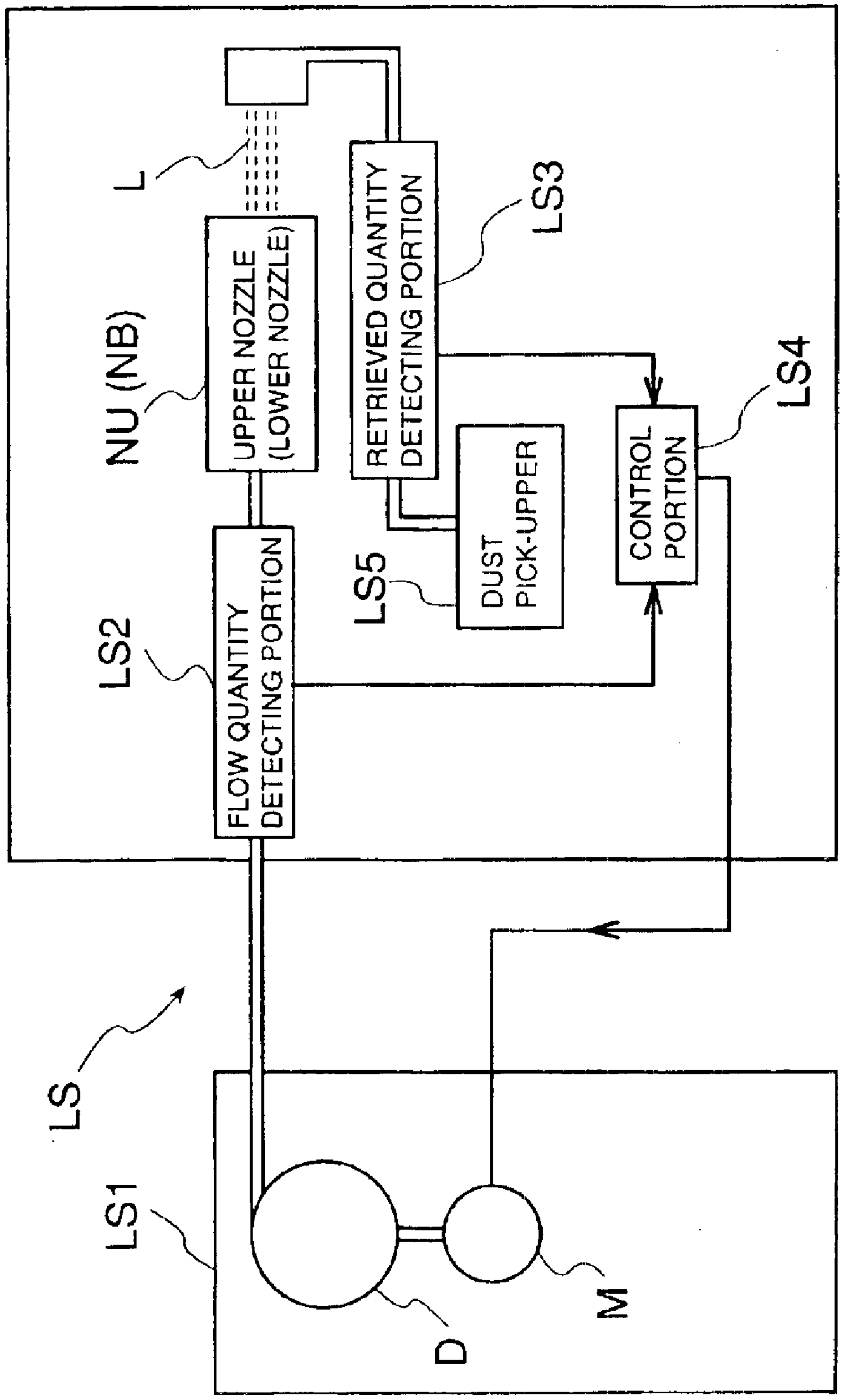
FIG. 9 is a block diagram showing a general arrangement of the powder lubricant supplying device in accordance with the embodiment.

The device LS for supplying and spraying powder lubricant constituting a powder lubricant supplying means comprises, as shown in FIG. 9, a powder lubricant supplying portion LS1 that sends out the powder lubricant L that attaches to an outer face of a rotary drum D driven by a motor M by means of an air flow, a flow quantity detecting portion LS2 that detects a flow quantity of the powder lubricant L sent out from the powder lubricant supplying portion LS1, a retrieved quantity detecting portion LS3 that detects a retrieved quantity of the powder lubricant L that is sprayed from the upper and the lower nozzles NU, NB and that does not attach to either the upper punch 5, the lower punch 6 or the die hole 41, a control portion LS4 that controls the powder lubricant supplying portion LS1 based on a quantity of the powder lubricant L detected by the flow quantity detecting portion LS2 and the retrieved quantity detecting portion LS3 and a dust pick-upper LS5 constituting the powder sucking mechanism. The powder lubricant supplying portion LS1 is arranged outside of the rotary compressive molding machine for powder material, while the flow quantity detecting portion LS2, the retrieved quantity detecting portion LS3, the control portion LS4 and the dust pick-upper LS5 are arranged in the rotary compressive molding machine for powder material.

The powder lubricant supplying portion LS1 is so arranged that powder lubricant L is filled into a groove provided on the outer face of the rotary drum D and the powder lubricant L filled in the groove is pushed in a pressurized condition into a tubule by means of pressurized air so as to be sent out to the flow quantity detecting portion LS2. The groove serves a function as a measuring portion of the powder lubricant L and controls a delivery quantity rate per unit of time, in other word, a quantity of a flow rate per unit of time by sending the powder lubricant L by means of a predetermined pressurized air. Superfluous powder lubricant L is removed from the outer face of the rotary drum D by a smoothing plate so that the powder lubricant L is not excessively filled and the superfluous powder lubricant L which-attaches near the groove does not enter the tubule as well. In accordance with the powder lubricant supplying portion LS1, a quantity of the powder lubricant L that is sent out is, for example, 5 through 25 gm per hour. The quantity of the powder lubricant L is detected by the flow quantity detecting portion LS2, a difference between the detected quantity and a quantity detected by the retrieved quantity detecting portion LS3 is calculated by the control portion LS4 and a flow quantity of the powder lubricant L is feedback controlled so as to be a predetermined quantity based on the calculated result.

Figure 10:
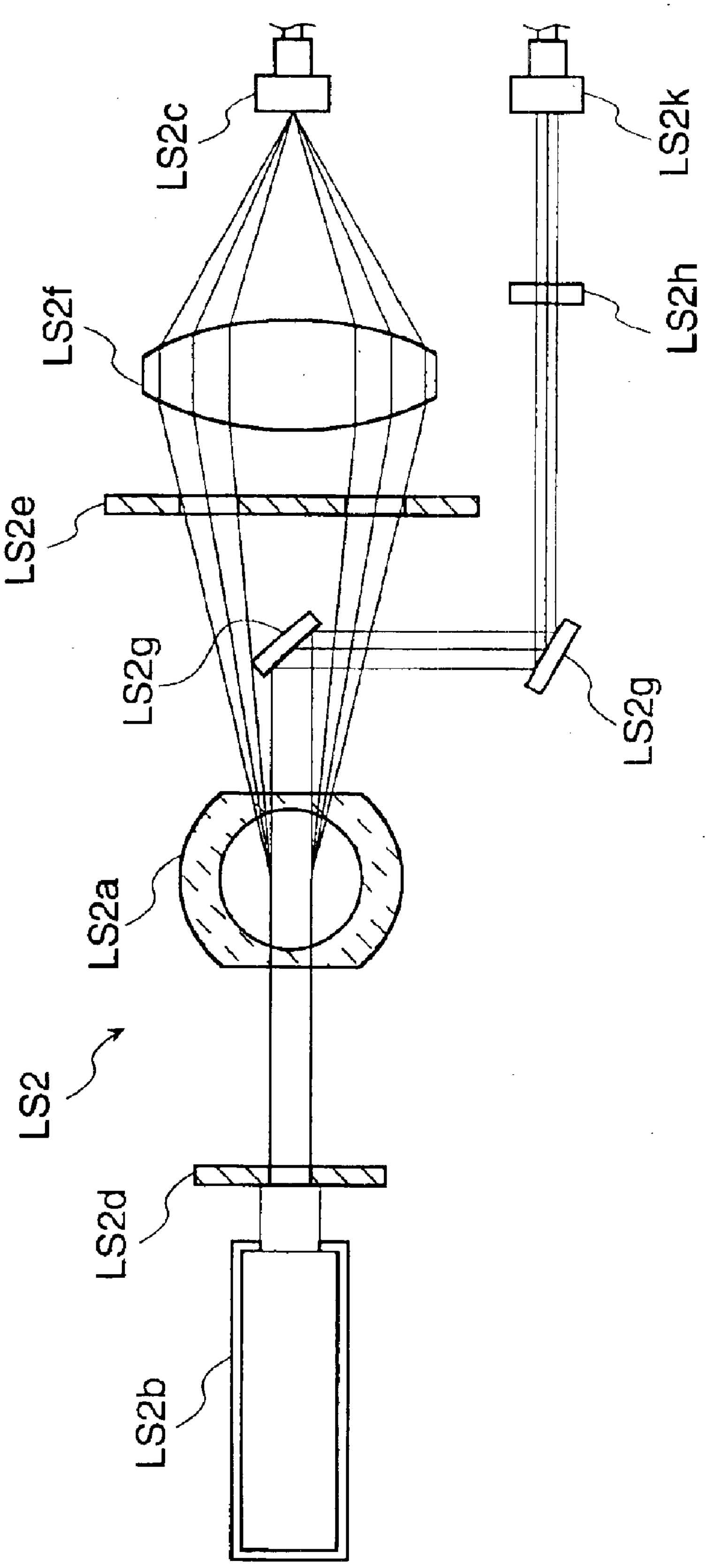
FIG. 10 is an explanatory view to show a general arrangement of the flow quantity detecting portion of the embodiment.

The flow quantity detecting portion LS2 comprises, as shown in FIG. 10, a flow cell LS2*a* as a light transparent detecting pipe inside of which the powder lubricant L flows, a laser pointer (hereinafter called a laser) that consists of a light visible semiconductor laser as a light source that irradiates light on the powder lubricant L flowing in the flow cell LS2*a*, a photo cell LS2*c* as a light detector that detects scattered light scattering from the powder lubricant L in the flow cell LS2*a*, a circular slit LS2*d* through which laser light irradiated from the laser LS2*b* passes, a toric slit LS2*e* through which the scattered light transmitted from the flow cell LS2*a* passes, a relay lens LS2*f* that gathers rays of laser light passing through the toric slit LS2*e* and a second photo cell LS2*k* that measures intensity of the laser light transmitted from the flow cell LS2*a* in order to adjust luminescence intensity through a reflecting mirror LS2*g*, LS2*g* and a filter LS2*h*. More specifically, the flow quantity detecting portion LS2 of this embodiment employs a method of a low angle light diffusion and detects the scattered light by means of the photo cell LS2*c*.

A signal output from the photo cell LS2*c* of the flow quantity detecting portion LS2 is input into the control portion LS4 and then a flow quantity of the powder lubricant L is calculated by the control portion LS4. More specifically, the control portion LS4 integrates the signal output from the photo cell LS2*c* with respect to each of a predetermined period, for example, 3~5 seconds. A cross-sectional area of the powder lubricant L flowing in the flow cell LS2*a* is detected by integrating the signal output from the photo cell LS2*c*. The control portion LS4 computes a mean value of the integrated value and calculates a flow quantity of the powder lubricant L based on the mean value of the integrated value. Intensity of the signal output from the photo cell LS2*c* is generally in proportion with a quantity of the powder lubricant L flowing in the flow cell LS2*a* and the higher an intensity of a signal is, the more the quantity of the powder lubricant L flows.

The retrieved quantity detecting portion LS3 is to measure a superfluous quantity of the powder lubricant L absorbed by the dust pick-upper LS5 and has the same arrangement as that of the flow quantity detecting portion LS2.

The control portion LS4 comprises a micro computer as a chief constituting element, an A/D converter that converts each of output signals from the flow quantity detecting portion LS2 and the retrieved quantity detecting portion LS3 and an electrical control unit having a memory that stores a measured result or a computed result or the like. The control portion LS4 measures each flow quantities of the powder lubricant L to be supplied and the powder lubricant L to be retrieved by the dust pick-upper LS5 based on the signal output from the flow quantity detecting portion LS2 and the retrieved quantity detecting portion LS3, computes a required flow quantity of the powder lubricant L based on the measured flow quantity and controls the powder lubricant supplying portion LS1 based on the calculated result. More specifically, a quantity, namely a consumed quantity Q1, of the powder lubricant L that is adhered to the lower face 5*a* of the upper punch 5, the upper face 6*a* of the lower punch 6 and the inner face of the die hole 41 is an amount that is subtracted a flow quantity, namely a retrieved quantity Q2, of the powder lubricant L measured based on the signal output from the retrieved quantity detecting portion LS3 from a flow quantity, namely a supplied quantity Q, of the powder lubricant L that is measured based on the signal output from the flow quantity detecting portion LS2. In case the computed consumed quantity Q1 exceeds a predetermined target consumed quantity Qt, the control portion LS4 controls the powder lubricant supplying portion LS1 so as to lessen a supplying quantity sent from the powder lubricant, supplying portion LS1. On the contrary, in case the computed consumed quantity Q1 is less than the predetermined target consumed quantity Qt, the control portion LS4 controls the powder lubricant supplying portion LS1 so as to increase the supplying quantity.

In accordance with the arrangement, the power lubricant L is sprayed at a timing that will be explained hereinafter.

The timing of spraying the powder lubricant L will be explained with reference to FIG. 3 sprinkled with a process to mold a tablet PL. Each of T0~T5 in FIG. 3 means a phase. The upper and the lower punches 5, 6 are kept at the highest position in a step when passing the unloading portion 10 (T0). Next, the upper and the lower punches 5, 6 move to the lubricant spraying portion K by a rotation of the rotary table 3 with the position of the upper and the lower punches 5, 6 kept at the highest position (T1). At this position, the powder lubricant L is sprayed to the upper punch 5. Next, when the rotary table 3 rotates, the lower punch 6 is lowered by an amount corresponding to a thickness of the tablet PL at a front end portion of the lowering device 71. At this position, the power lubricant L is sprayed to the lower punch 6 and the die 4 (T2). As a result of this, the powder lubricant L can adhere to the upper face 6*a* of the lower punch 6 and the inner face of the die hole 41 by a depth corresponding to the thickness of the tablet PL.

As mentioned above, since the powder lubricant L is sprayed from the upper nozzle NU when the upper punch 5 is kept at the highest position, the sprayed powder lubricant L intensively adheres to the lower face 5*a* of the upper punch 5. Then since the lower punch 6 paired with the upper punch 5 and the die 4 pass below the lower nozzle NB with the above-mentioned position kept, the powder lubricant L sprayed from the lower nozzle NB adheres to the lower punch 6 and the inner face of the die hole 41. Since the powder lubricant L is guided by the concave face NUa of the upper nozzle NU and the concave face NBa of the lower nozzle NB and sprayed, the powder lubricant L diffuses in a generally even state toward the lower face 5*a* of the upper punch 5, the upper face 6*a* of the lower punch 6 and the inner face of the die hole 41. More specifically, since the concave face NUa, NBa is a three dimensional curved surface, in case the powder lubricant L is sprayed from the introducing hole NUc, NBc and collides against the concave face NUa, NBa, the powder lubricant L travels along the concave face NUa, NBa in a direction of spraying the powder lubricant L from the introducing hole NUc, NBc and a direction that crosses the above direction. In a case of the upper nozzle NU, since the concave face NUa faces to the through hole K1 locating just above the concave face NUa, the powder lubricant L passes through the hole K1 and reaches the lower face 5*a* of the upper punch 5. In a case of the lower nozzle NB, the powder lubricant L is guided by the concave face NBa and reaches directly the upper face 6*a* of the lower punch 6 and the inner face of the die hole 41. As a result of this, the powder lubricant L adheres evenly to general whole area of the lower face 5*a* of the upper punch 5, the upper face 6*a* of the lower punch 6 and the inner face of the die hole 41 by a predetermined depth. In this case, since the air curtain AC exists above the lower face 5*a* of the upper punch 5, the powder lubricant L that does not attach the lower face 5*a* of the upper punch 5 reaches an inlet along the air flow of the air curtain AC and is retrieved from the pipe P by the dust pick-upper LS5 through the retrieved quantity detecting portion LS3. For a case of the lower nozzle NB, since the concave face NBa faces downward, the superfluous powder lubricant L that is bounced against the upper face 6*a* of the lower punch 6 and the rotary table 3 flows into the pipe P along the first upper wall BX2 and the powder lubricant L that flows out of the through hole K1 flows into the pipe P through an inlet K2 by the air flow of the air curtain AC like the case of the upper nozzle NU.

Next, when the lower punch 6 moves to the filling portion 7 due to a rotation of the rotary table 3, the lower punch 6 is first lowered to a middle position under the guidance of a front half of the lowering device 71 and then to a further lower position under the guidance of a rear half thereof (T3). On its way the powder material supplied on the rotary table 3 by the powder material supplying mechanism 73 is evenly introduced by making use of guidance by the feed shoe 72. Then the lower punch 6 runs up onto a quantity setting rail 82, which raises the lower punch 6 until it reaches a predetermined height and a predetermined quantity of powder material is filled into the die 4. The powder material which has overflowed from the die 4 is leveled when it passes through the leveling plate 8 and gathered toward the center of the rotary table 3. During this process, the upper punch 5 is kept at the highest position by a guide rail 102.

Next, the upper punch 5 is lowered (T4) under the guidance of the upper punch lowering cam 91 so as to insert the tip thereof into the die 4. Then the powder material in the die 4 is compressed and molded into the tablet PL by the upper and lower punches 5, 6 which pass between the upper and lower preliminary compressive rollers 92, 93 and the upper and lower compressive rollers 94, 95 (T5).

After the tablet PL is molded, the upper punch 5 is raised under the guidance of the upper punch raising cam 100 so as to be withdrawn out of the die 4, and then the tablet PL in the die 4 is pushed upward so as to come out on the rotary table 3 by the lower punch 6 pushed by the pushing up rail 106. The tablet PL is guided onto a shoot 104 by the guide plate 105 and introduced out of the rotary compressive molding machine for powder material. Next, the upper punch 5 is further raised under the guidance of the upper punch raising cam 100. As mentioned above, the rotary compressive molding machine for powder material can produce a predetermined tablet PL repeatedly and successively with the powder material compressed and molded.

In accordance with thus arranged rotary compressive molding machine for powder material of this embodiment, since a quantity of the powder lubricant L sent out from the powder lubricant supplying portion LS1 and a quantity of the superfluous powder lubricant L retrieved by the dust pick-upper LS5 are detected and a quantity of the powder lubricant L to be sent by the powder lubricant supplying portion LS1 is controlled so as to be an actually required quantity based on the detected quantities, the quantity of the powder lubricant L sent out from the power lubricant supplying portion LS1 can be adjusted in a subtle manner, the quantity of the powder lubricant L to be sprayed can be optimally adjusted and wasteful consumption of the powder lubricant L can be minimized. In addition, since the powder lubricant L is sprayed at a minimum required quantity, contamination of the powder material to be molded can be inhibited to a lower level in a cy pres manner. Further, since the quantity of the flow is detected by means of the scattered light in the flow quantity detecting portion LS2 and the retrieved quantity detecting portion LS3, the quantity of the flow can be detected continuously. In addition, since the quantity of the flow can be detected in a closed space of the flow cell LS2*a*, the powder lubricant L can be prevented from scattering all over the area, thereby to maintain a predetermined detecting accuracy for a long term.

Furthermore since a quantity of the superfluous powder lubricant L can be reduced, the air curtain AC can prevent the sprayed powder lubricant L from scattering upward and the superfluous powder lubricant L that scatters outside or inside the box body BX can be retrieved, it is possible to prevent a problem such as a case in which the powder lubricant L attaches to the upper die 5 or the rotary table 3 unnecessarily and to be lumpy and then drops when a lump of the powder lubricant L grows to a certain size and also possible to prevent in advance from occurring a case in which the lump of the powder lubricant L drops on the rotary table 3 and crashes into pieces and the powder lubricant L is mixed into the powder material to be molded into the tablet PL.

In addition, since the powder lubricant L is guided by the concave face NUa of the upper nozzle NU and the concave face NBa of the lower nozzle NB and sprayed to a portion that contacts with the powder material, namely, the lower face 5*a* of the upper punch 5, the upper face 6*a* of the lower punch 6 and the inner face 41 of the die 4 every time prior to compression of the powder material, the powder lubricant L attaches to the portion in a generally uniform condition and a sticking phenomenon can be prevented securely. In addition, since the sprayed powder lubricant L is in a small quantity and minimum required in order to prevent a sticking phenomenon, a problem that the powder material resides in the upper punch 5, the lower punch 6 or the die hole 41 because of the powder lubricant L can be prevented. As a result of this, it is possible to manufacture a tablet PL that has enough hardness with a powder material in which the powder lubricant L is not mixed.

Further, the air curtain AC and the bellow 5*n* are arranged near a bottom end of the upper punch 5 when the upper punch 5 locates at the powder lubricant spraying portion K, it is possible to prevent the powder lubricant L that leaks from the box body BX of the powder lubricant spraying portion K from unnecessarily attaching to the upper punch 5. In addition, since the powder lubricant L is sprayed at a small quantity near the end face of the upper punch 5 and the lower punch 6 and the superfluous powder lubricant L is retrieved by making use of the air flow of the air curtain AC, it is possible to prevent the superfluous powder lubricant L from scattering certainly.

This invention is not limited to the above-explained embodiments.

For example, the flow quantity detecting portion may comprise an electrode for measurement that detects electrical capacitance of the powder lubricant flowing inside the detecting pipe and the flow quantity of the powder lubricant is detected based on a variation of the electrical capacitance detected by the electrode for measurement. In this case, a reference electrode is provided to give a relative voltage corresponding to an environment so as to set off an effect on the electrical capacitance that is detected by the electrode for measurement. As mentioned above, if the reference electrode is provided, it is possible to lessen an effect on the electrical capacitance detected with a variation of the environment, more specifically a variation of temperature or humidity of ambulances, thereby to improve the accuracy of detection. In addition, like the above embodiment, since the quantity of the powder lubricant L can be detected while the powder lubricant L is flowing, time to require for detection can be cut down, thereby to speed up detection.

The other arrangement of the component is not limited to the embodiment described in drawings and there may be various modifications without departing from the spirit of the invention.

POSSIBLE APPLICATIONS IN INDUSTRY

As mentioned above, in accordance with the present claimed invention, since the flow quantity detecting portion detects a flow quantity of the powder lubricant sent out from the powder lubricant supplying portion and the control portion computes a quantity of the powder lubricant to send out based on the quantity detected by the flow quantity detecting portion and the superfluous quantity detected by the retrieved quantity detecting portion and controls the powder lubricant supplying portion, it is possible to control the quantity of the powder lubricant so as to be an actually required quantity based on the quantity detected by the flow quantity detecting portion and the superfluous quantity detected by the retrieved quantity detecting portion. As a result of this, it is possible to spray the powder lubricant by controlling the quantity of the powder lubricant with high accuracy, thereby to improve effectiveness of using the powder lubricant. This makes is possible to cut a quantity of the powder lubricant to the minimum and improve an economical efficiency.

In addition, since a quantity of the superfluous powder lubricant can be reduced, it is possible to suppress mixture of the powder lubricant into a powder material to be compressed and molded in a cy-press manner and also possible to prevent a problem such as a case in which powder lubricant attaches to the die or the rotary table unnecessarily and to be lumpy so as to drop when a lump of the powder lubricant grows to a certain size. The lump of the powder lubricant might drop on the rotary table and crash into pieces and the powder lubricant is mixed into the powder material. With this arrangement, a case like the above can be prevented from occurring.

If the flow quantity detecting portion comprises a light transparent detecting pipe inside of which the powder lubricant flows, a light source that irradiates light on the powder lubricant that flows inside the detecting pipe and a light detector that detects scattered light that is scattered by the powder lubricant inside the detecting pipe and the flow quantity of the powder lubricant flowing inside the detecting pipe is detected by means of scattered luminous intensity, the flow quantity detecting portion makes use of the intensity of the scattered light scattered by the powder lubricant flowing inside the detecting pipe, which makes it possible to detect a subtle quantity of the flowing powder lubricant with high speed and high accuracy.

If the powder lubricant supplying means further comprises a powder sucking mechanism that introduces the superfluous powder lubricant into the retrieved quantity detecting portion, with the powder sucking mechanism provided, it is possible to detect the flow quantity of the powder lubricant by making use of the above light or electrical capacitance, thereby to improve an accuracy of detecting a retrieved quantity. Therefore, it is possible to detect a quantity that is actually used accurately based on the supplied quantity of the powder lubricant detected by the flow quantity detecting portion and the retrieved quantity of the powder lubricant, which makes it possible to control the supplying quantity of the powder lubricant with accuracy.

What is claimed is:

1. A rotary compressive molding machine for powder material wherein a rotary table is rotatably arranged in a frame through an upright shaft, a die having a die hole is arranged on the rotary table, an upper punch and a lower punch are kept above and below the die in a vertically slidable condition and powder material filled in the die hole is compressed and molded between a lower face of the upper punch and an upper face of the lower punch by pushing the upper punch and the lower punch so as to approach each other with their tip inserted into the die hole, comprising a powder lubricant supplying means that supplies the upper face of the lower punch, the lower face of the upper punch and the die hole with powder lubricant prior to filling the powder material, wherein the powder lubricant supplying means comprises a powder lubricant supplying portion that stores powder lubricant and sends out the stored powder lubricant continuously, a flow quantity detecting portion having a light transparent detecting pipe inside of which the powder lubricant flows, that optically detects a flow quantity of the powder lubricant sent out from the powder lubricant supplying portion and flows inside of the detecting pipe, a retrieved quantity detecting portion that detects a quantity of superfluous powder lubricant other than the powder lubricant actually used while the powder material is compressed and molded based on the quantity detected by the flow quantity detecting portion, and a control portion that computes a quantity of the powder lubricant to send out based on a quantity detected by the flow quantity detecting portion and the retrieved quantity detecting portion respectively and controls the powder lubricant supplying portion so as to send out the powder lubricant at a computed quantity.

2. The rotary compressive molding machine for powder material described in claim 1 and wherein the flow quantity detecting portion further comprises a light source that irradiates light on the powder lubricant that flows inside the detecting pipe and a light detector that detects scattered light that is scattered by the powder lubricant inside the detecting pipe wherein the flow quantity of the powder lubricant flowing inside the detecting pipe is detected by means of scattered luminous intensity.

3. The rotary compressive molding machine for powder material described in claim 1 and characterized by that the powder lubricant supplying means further comprises a powder sucking mechanism that introduces the superfluous powder lubricant into the retrieved quantity detecting portion.

4. The rotary compressive molding machine for powder material described in claim 2 and characterized by that the powder lubricant supplying means further comprises a powder sucking mechanism that introduces the superfluous powder lubricant into the retrieved quantity detecting portion.

* * * * *